United States Patent
Wittenberg et al.

(10) Patent No.: US 8,844,815 B2
(45) Date of Patent: Sep. 30, 2014

(54) METHOD OF ADJUSTING POINTING DIRECTIONS OF MULTIPLE CAMERAS IN BARCODE SCANNER

(71) Applicant: Symbol Technologies, Inc., Schaumburg, IL (US)

(72) Inventors: Carl D. Wittenberg, Water Mill, NY (US); Thomas C. Mullaney, East Moriches, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/787,361

(22) Filed: Mar. 6, 2013

(65) Prior Publication Data

US 2014/0183262 A1 Jul. 3, 2014

Related U.S. Application Data

(60) Provisional application No. 61/748,595, filed on Jan. 3, 2013.

(51) Int. Cl.
*G06K 7/00* (2006.01)
*G06K 7/14* (2006.01)

(52) U.S. Cl.
CPC .................................. *G06K 7/1404* (2013.01)
USPC ......................................................... 235/440

(58) Field of Classification Search
CPC .......... G06K 7/10712; G06K 7/10722; G06K 7/10821; G06K 7/10831; G06K 7/10861; G06K 7/1096
USPC .............................. 235/440, 454, 459, 462.14
See application file for complete search history.

(56) References Cited

U.S. PATENT DOCUMENTS

| | | | |
|---|---|---|---|
| 6,457,644 B1 * | 10/2002 | Collins et al. | 235/462.14 |
| 8,146,822 B2 * | 4/2012 | Drzymala et al. | 235/462.41 |
| 8,387,878 B2 * | 3/2013 | Chen et al. | 235/440 |
| 8,505,824 B2 * | 8/2013 | Drzymala et al. | 235/462.17 |
| 2007/0295893 A1 | 12/2007 | Olsen et al. | |
| 2009/0001166 A1 | 1/2009 | Barkan et al. | |
| 2010/0127082 A1 | 5/2010 | Drzymala | |

FOREIGN PATENT DOCUMENTS

| | | |
|---|---|---|
| EP | 944017 A2 | 9/1999 |
| EP | 650133 B1 | 5/2000 |

* cited by examiner

*Primary Examiner* — Seung Lee
(74) *Attorney, Agent, or Firm* — Nong-Qiang Fan

(57) ABSTRACT

A workstation with a housing having a upright window and a horizontal window includes a printed circuit board having at least two imaging sensors thereon located in the housing, and a controller operative to read a barcode in a captured image. The workstation also includes a chassis firmly mounted on the printed circuit board, and two inserts each configured to hold steadily one of at least two lens assemblies. At least one of the two inserts includes multiple slots for attaching such insert to the chassis at a position that is laterally adjustable.

20 Claims, 20 Drawing Sheets

US 8,844,815 B2

METHOD OF ADJUSTING POINTING DIRECTIONS OF MULTIPLE CAMERAS IN BARCODE SCANNER

RELATED APPLICATIONS

The present application is related to claims benefit under 35 U.S.C. §119(e) from U.S. Provisional Patent Application Ser. No. 61/748,595, filed Jan. 3, 2013, titled "Method of Adjusting Pointing Directions of multiple cameras in Barcode Scanner", the entire contents of which being incorporated herein by reference.

FIELD OF THE DISCLOSURE

The present invention relates to imaging-based barcode readers.

BACKGROUND

It is known to use laser-based and/or imaging-sensor-based readers or scanners in a dual window or bi-optical workstation to electro-optically read indicia, such as bar code symbols, associated with three-dimensional products to be identified and processed, e.g., purchased, at a point-of-transaction workstation provided at a countertop of a checkout stand in supermarkets, warehouse clubs, department stores, and other kinds of retailers. The products are typically slid or moved by a user across, or presented to a central region of, a generally horizontal window that faces upwardly above the countertop and/or a generally vertical or upright window that rises above the countertop. When at least one laser scan line generated by a laser-based reader sweeps over a symbol and/or when return light from a symbol is captured over a field of view by an imaging sensor in a reader, the symbol is then processed, decoded and read, thereby identifying the product.

The symbol may be located low or high, or right to left, on the product, or anywhere in between, on any of six sides of the product. The symbol may be oriented in a "picket fence" orientation in which elongated parallel bars of a one-dimensional Universal Product Code (UPC) symbol are vertical, or in a "ladder" orientation in which the UPC symbol bars are horizontal, or at any orientation angle in between. The products may be held by the user at various tilt angles during their movement across, or presentation to, either window. The products may be positioned either in contact with, or held at a working distance away from, either window during such movement or presentation. All these factors make the symbol location variable and difficult to predict in advance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
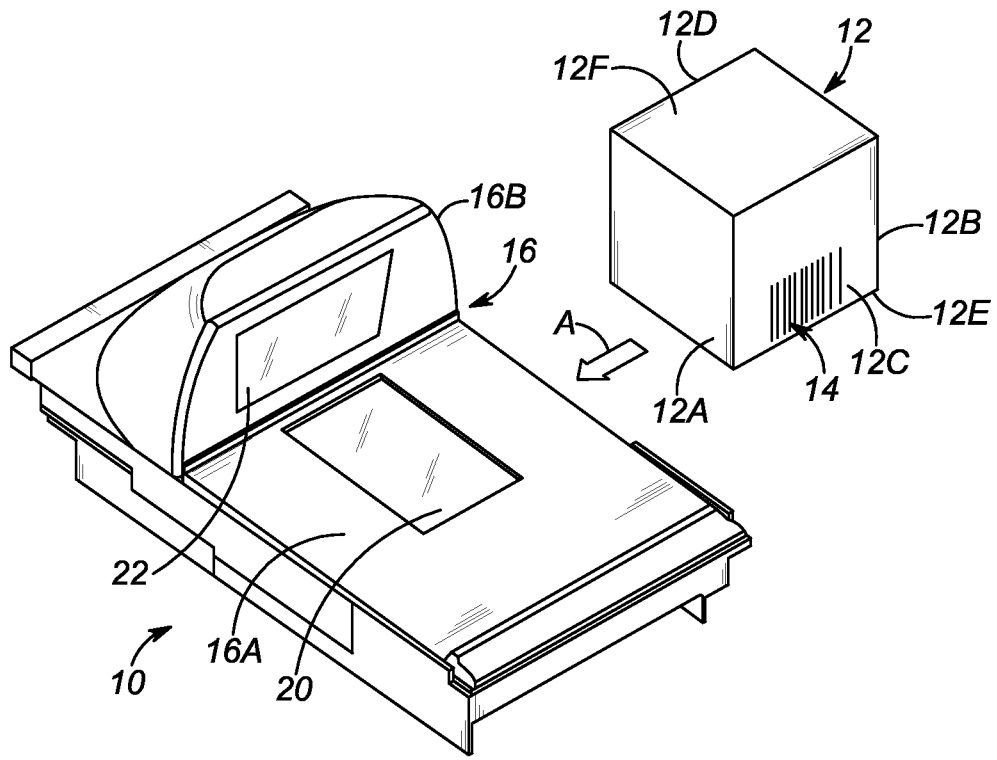
FIG. 1 is a perspective view of a dual window, bi-optical, point-of-transaction workstation or imaging reader operative for reading indicia on a multi-sided product passing through the workstation by image capture.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein

DETAILED DESCRIPTION

This invention relates to a point-of-transaction workstation for electro-optically imaging indicia associated with multi-sided products. The indicia are preferably bar code symbols that are electro-optically read in order to identify products being purchased at the workstation. In a preferred embodiment, the workstation is a bi-optical or dual window workstation having a generally horizontal window supported by a housing and located in a generally horizontal plane, and an upright window, also supported by the housing, and located in a generally upright plane that intersects the generally horizontal plane. The upright plane may lie in a vertical plane, or be slightly rearwardly or forwardly inclined relative to the vertical plane. The products are passed by an operator or a customer through a scan zone, which occupies the space at and above the horizontal window, and also occupies the space at and in front of the upright window.

At least one solid-state imaging sensor, and preferably two solid-state imaging sensors, one for, and associated with, each window, are supported by the housing. Preferably, both imaging sensors are commonly mounted on a printed circuit board. Each imaging sensor has an array of photosensitive elements (also known as pixels) with a field of view. Each imaging sensor preferably comprises a two-dimensional, charge coupled device (CCD) array, or a complementary metal oxide semiconductor (CMOS) array, of photosensitive elements of megapixel size, e.g., 1280 pixels wide×960 pixels high. The array of photosensitive elements is arranged along mutually perpendicular array axes, i.e., a row axis and a column axis. Each imaging sensor includes an imaging lens assembly for capturing return light from the indicia and for projecting the captured return light onto the array of photosensitive elements. Each imaging sensor has an electronic shutter, typically a global shutter, that exposes the imaging sensor for an exposure time, preferably pre-set for the maximum anticipated exposure time needed to capture indicia at the maximum working distance away from the window. By way of example, the maximum exposure time can be set to a value between 400-750 microseconds. Each imaging sensor preferably operates at a frame rate of sixty frames per second, each frame lasting about 16.67 milliseconds.

An optical system is supported by the housing and is operative for splitting the field of view of at least one of the imaging sensors into a plurality of subfields of view that extend through at least one of the windows over regions of the product. Preferably, the optical system includes a first optical splitter for splitting the field of view of one of the imaging sensors into three subfields of view that pass through one of the windows, and a second optical splitter for splitting the other field of view of the other imaging sensor into another three subfields of view that pass through the other of the windows. As discussed above, the use of optical splitters reduces the number of imaging sensors in the workstation. Thus, only two imaging sensors are preferably needed to produce six subfields. These six subfields provide optimum visibility of indicia on various sides of a product being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users. If a user should present a product in an unusual way, however, such as by positioning the indicia opposite one of the windows, a subfield will still be positioned to read that indicia.

A plurality of energizable illuminators, one for each subfield of view, is operative for illuminating each subfield of view with illumination light over an adjustable illumination time, preferably in a range of about 0.25 to about 0.75 milliseconds. Each illuminator preferably includes multiple illumination light sources, e.g., light emitting diodes (LEDs). The imaging lens assembly is operative for capturing the illumination light returned from the indicia in each subfield of view along respective optical paths from each window to each imaging sensor.

FIG. 1 depicts a dual window, bi-optical, point-of-transaction workstation 10 for electro-optically imaging indicia 14 or targets, such as the illustrated UPC symbol described above, associated with multi-sided, three-dimensional products 12, and is typically used by retailers to process transactions involving the purchase of the products 12 bearing, or printed with, the identifying indicia 14. The workstation 10 includes a housing 16 having a generally horizontal window 20 located in a generally horizontal plane and supported by a horizontal housing portion 16A, and an upright window 22 located in a generally upright plane that intersects the generally horizontal plane and supported by a raised housing portion 16B. The upright plane may lie in a vertical plane, or be slightly rearwardly or forwardly inclined relative to the vertical plane. The upright window 22 is preferably recessed within its housing portion 16B to resist scratching. By way of numerical example, the generally horizontal window 20 measures about four inches in width by about six inches in length, while the generally upright window 22 measures about six inches in width by about eight inches in length. The products are passed by an operator or a customer through a scan zone, which occupies the space at and above the horizontal window 20, and also occupies the space at and in front of the upright window 22.

The indicia 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The indicia 14 could also be a non-symbol target, such as a personal check, a credit card, a debit card, a signature, a driver's license, the consumer himself or herself, or the operator himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes. Thus, it can be determined if the operator is actually scanning the products, or passing them around the windows in an effort to bypass the windows and not charge the customer in a criminal practice known in retailing as "sweethearting".

The product 12 need not be a three-dimensional box as illustrated, but can be any object having a left side 12A, a right side 12B, a front side 12C, a rear side 12D, a bottom side 12E, and a top side 12F. The product 12 is slid or moved by an operator or a customer across and past the windows 20, 22 in the direction of the arrow A through the scan zone, or is presented to a central region of either window. As described above, the product 12 can be tilted or moved in other directions through the workstation 10.

Figure 3:
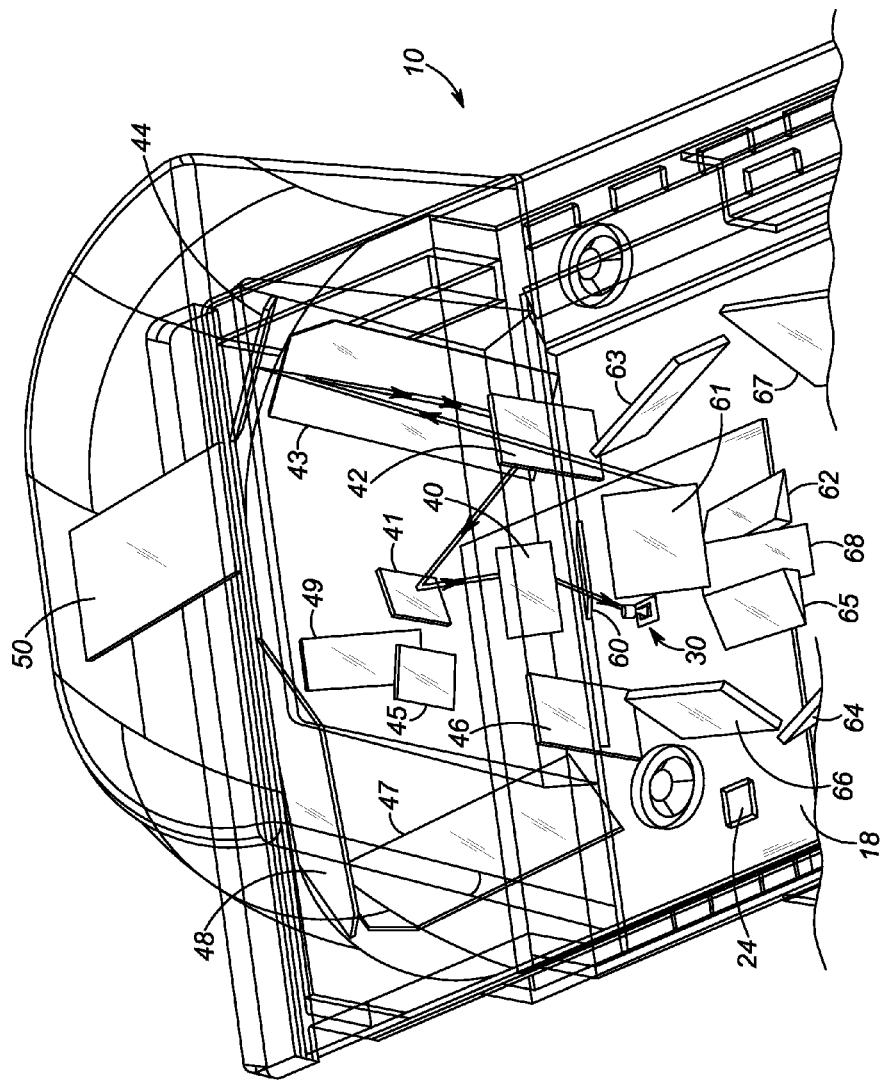
FIG. 3 is a broken-away, enlarged, perspective view of part of an optical system in the workstation of FIG. 1 diagrammatically depicting a folded optical path of an outer subfield of view of the imaging sensor of FIG. 2 for exit through an upright window.
Figure 4:
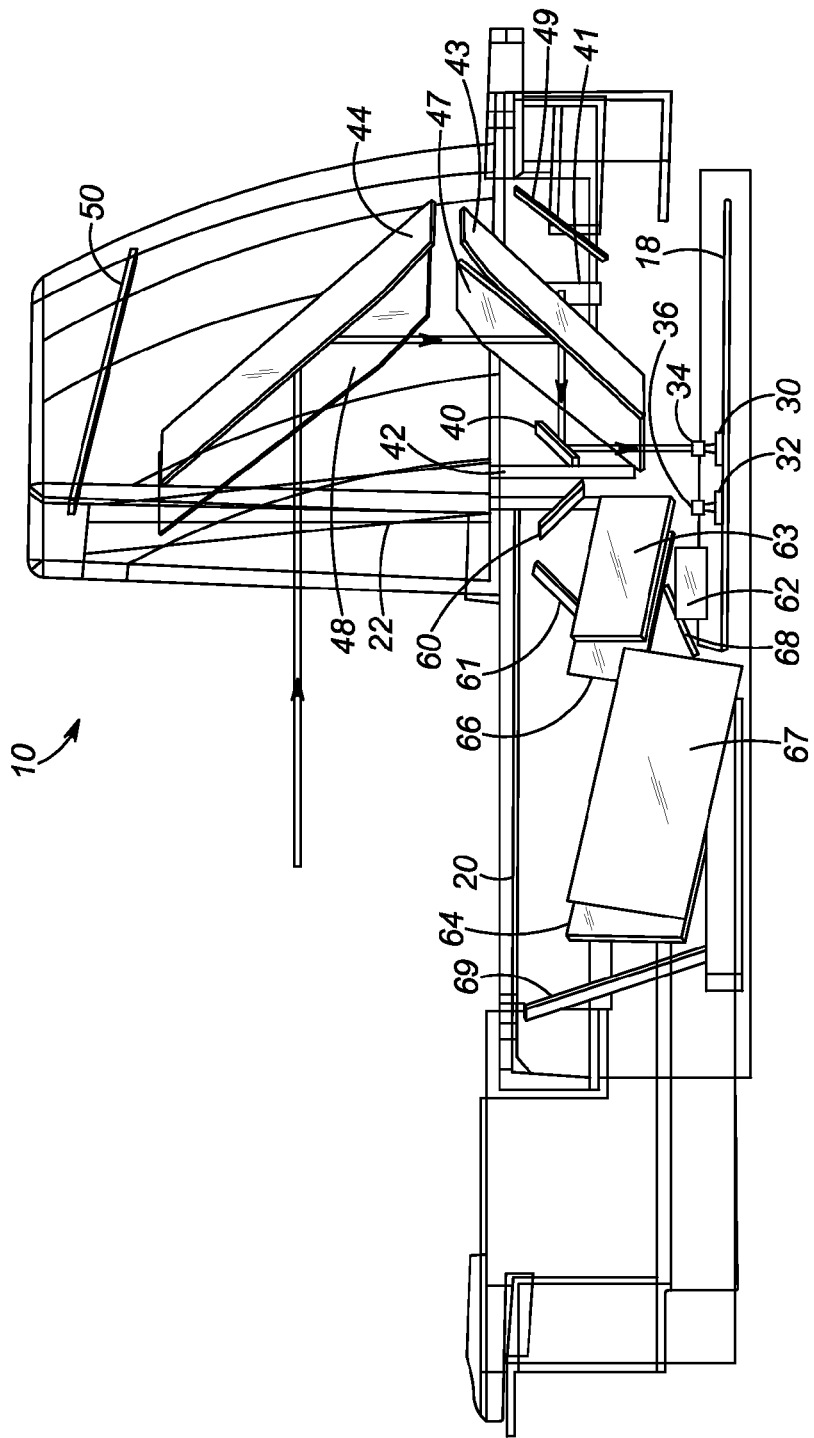
FIG. 4 is a side perspective, enlarged, view of the optical path of FIG. 3.
Figure 14:
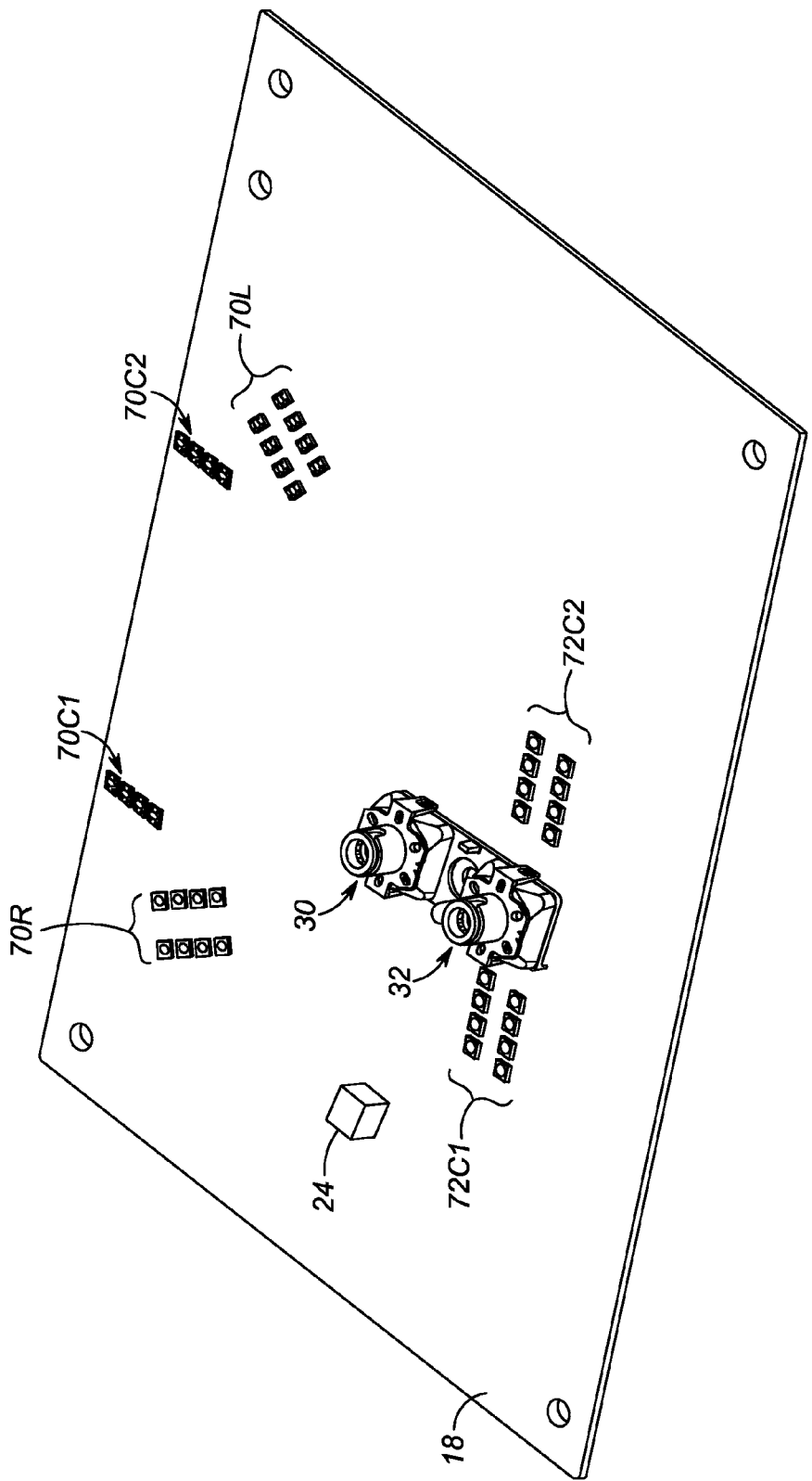
FIG. 14 is a perspective view of a plurality of illuminators and a plurality of exposure sensors commonly mounted on a main printed circuit board within the workstation of FIG. 1 in accordance with this invention.

As best shown in FIGS. 3-4, a first solid-state imaging sensor 30 and a second solid-state imaging sensor 32 are commonly supported on a printed circuit board 18 within the housing (see also FIG. 14). Each imaging sensor 30, 32 has an array of photosensitive elements with a field of view diagrammatically shown by speckles in the various views. As described below, the field of view of the first imaging sensor 30 is directed out of the upright window 22; hence, the first imaging sensor 30 will be individually referred to as the vertical imaging sensor 30 for convenience. Similarly, the field of view of the second imaging sensor 32 is directed out of the horizontal window 20; hence, the second imaging sensor 32 will be individually referred to as the horizontal imaging sensor 32 for convenience.

Figure 2:
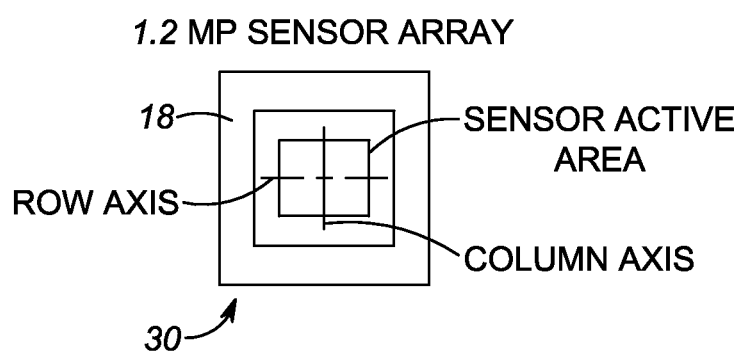
FIG. 2 is a top plan view of an array of photosensitive elements of an imaging sensor for use in the workstation of FIG. 1.

Each imaging sensor 30, 32 preferably comprises a two-dimensional, charge coupled device (CCD) array, or a complementary metal oxide semiconductor (CMOS) array, of photosensitive elements of megapixel size, e.g., 1280 pixels wide×960 pixels high. In a preferred embodiment, the field of view of each imaging sensor 30, 32 measures about 15 degrees by 30 degrees. The arrays of both imaging sensors 30, 32 extend along mutually perpendicular, row and column, directions. Thus, as shown in FIG. 2, each imaging sensor has a row axis and a column axis. Each imaging sensor 30, 32 includes an imaging lens assembly 34, 36 (see FIG. 4) for capturing return light from the indicia and for projecting the captured return light onto the respective array of photosensitive elements.

Each imaging sensor 30, 32 preferably has a shutter, typically a global shutter, that exposes each imaging sensor for an exposure time, preferably pre-set for the maximum anticipated exposure time needed to capture indicia at the maximum working distance away from each window. By way of example, the maximum exposure time can be set to a value between 400-750 microseconds. Each imaging sensor preferably operates at a frame rate of sixty frames per second, each frame lasting about 16.67 milliseconds. The shutter insures that the captured images will not be disturbed by motion of the indicia 14 relative to the window(s) during the exposure time. The indicia 14 can be presented or swiped at speeds up to around 100 inches per second across any part of either window.

Figure 13:
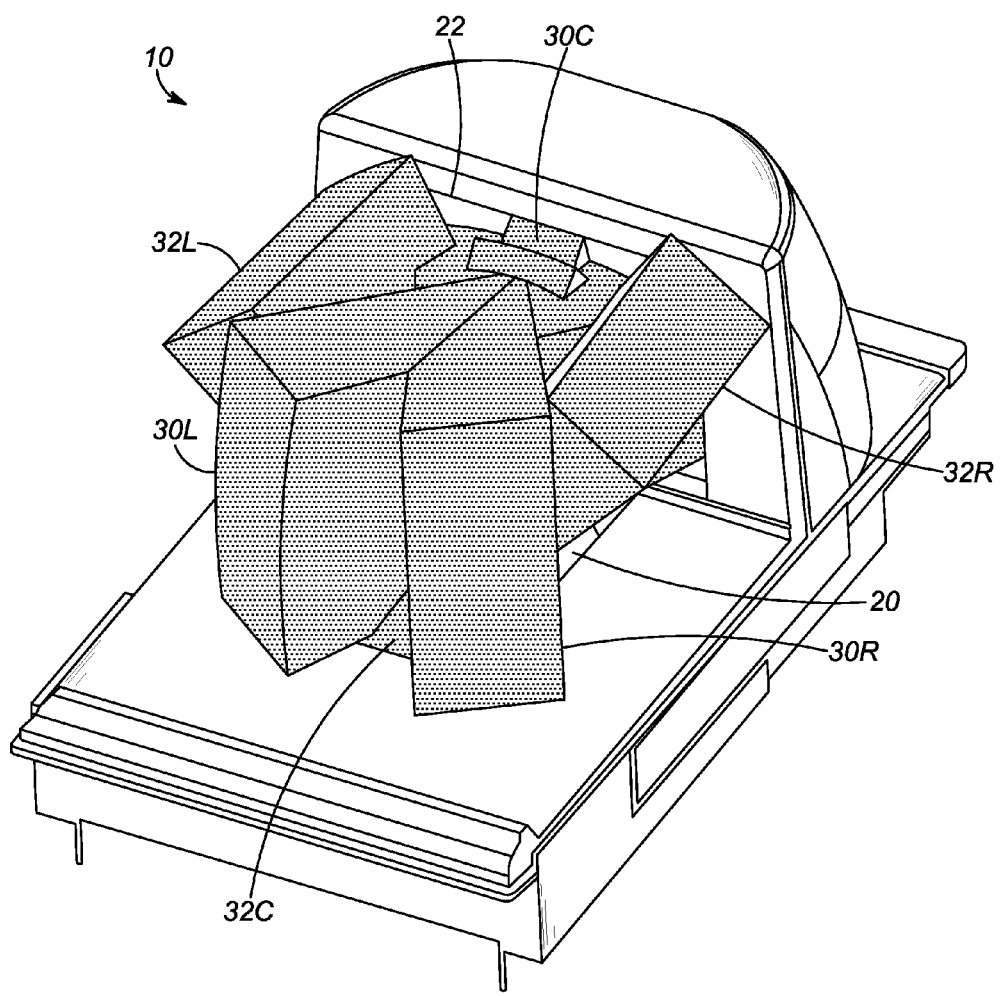
FIG. 13 is a perspective view of the workstation of FIG. 1 diagrammatically depicting all six subfields exteriorly of the windows.

An optical system is supported by the housing 16 and is operative for directing the captured return light along a first folded optical path from the upright window 22 to the vertical imaging sensor 30, and along a second folded optical path from the horizontal window 20 to the horizontal imaging sensor 32. As described in more detail below, the optical system is further operative for splitting the field of view of the vertical imaging sensor 30 into a plurality of subfields of view, namely a center subfield 30C flanked by two outer, right and left, subfields 30R, 30L, and for splitting the field of view of the horizontal imaging sensor 32 into a plurality of subfields of view, again a center subfield 32C flanked by two outer, right and left, subfields 32R, 32L. These various subfields outside of the windows 20, 22 are shown in FIG. 13.

The optical system has a plurality of fold mirrors each positioned in each of the first and second optical paths to fold the captured return light in the subfields of view. As shown in FIGS. 3-4, a first plurality of fold mirrors 40, 41, 42, 43 and 44 are positioned along a first optical path part between the vertical imaging sensor 30 and the upright window 22 to fold the captured return light in the outer subfield 30L to successively reflect off mirrors 44, 43, 42, 41 and 40, in that order, prior to being focused by the imaging lens assembly 34 onto the vertical imaging sensor 30. In analogous manner, a second plurality of fold mirrors 40, 45, 46, 47 and 48 are positioned along a second optical path part between the vertical imaging sensor 30 and the upright window 22 to fold the captured return light in the outer subfield 30R to successively reflect off mirrors 48, 47, 46, 45 and 40, in that order, prior to being focused by the imaging lens assembly 34 onto the vertical imaging sensor 30. A third plurality of fold mirrors 40, 49, and 50 are positioned along a third optical path part between the vertical imaging sensor 30 and the upright window 22 to fold the captured return light in the center subfield 30C to successively reflect off mirrors 50, 49 and 40, in that order, prior to being focused by the imaging lens assembly 34 onto the vertical imaging sensor 30.

Figure 5:
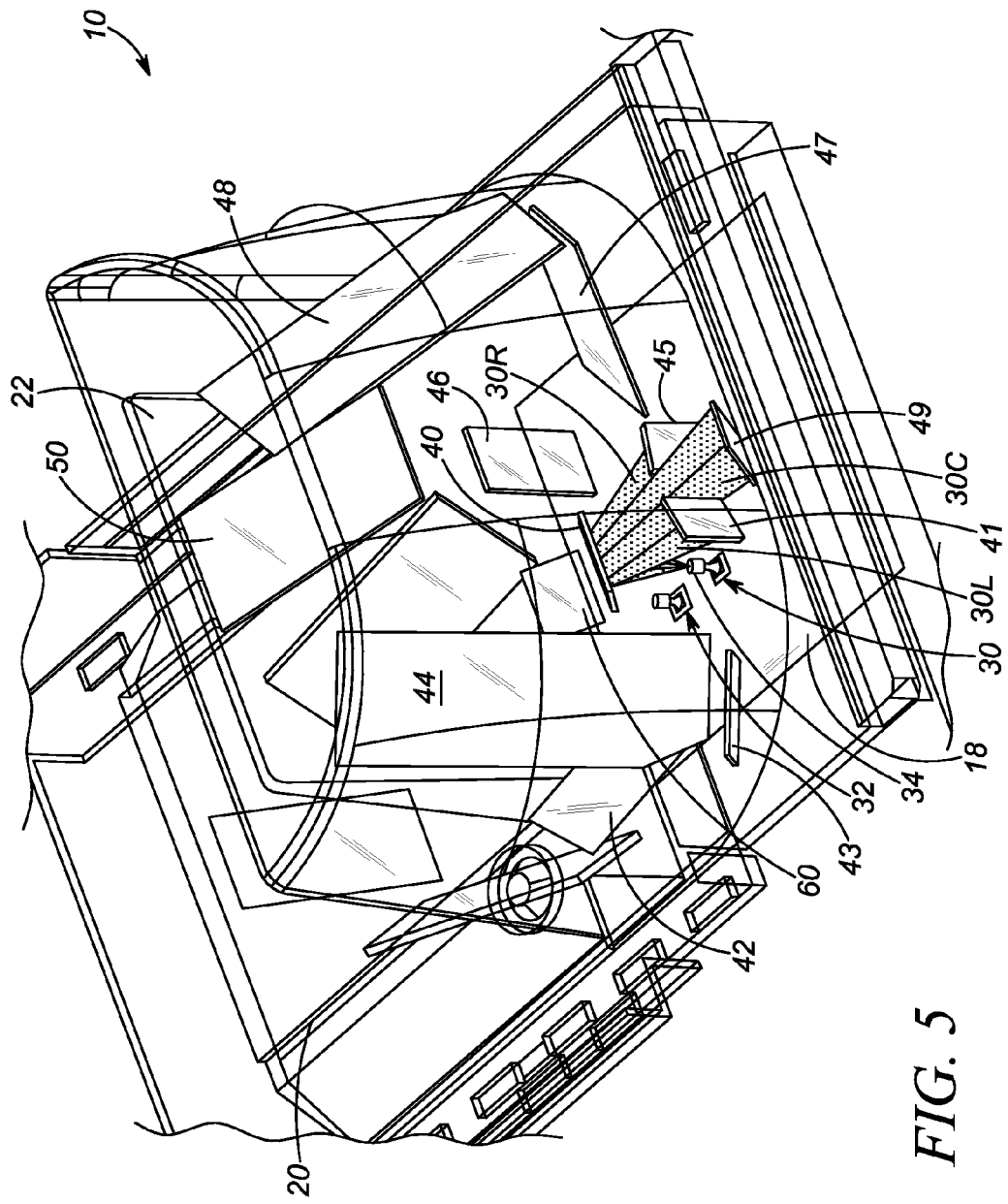
FIG. 5 is a rear perspective view of the optical system part of FIG. 3 depicting an optical splitter for splitting the field of view of the imaging sensor into a central subfield of view flanked by two outer subfields of view.
Figure 6:
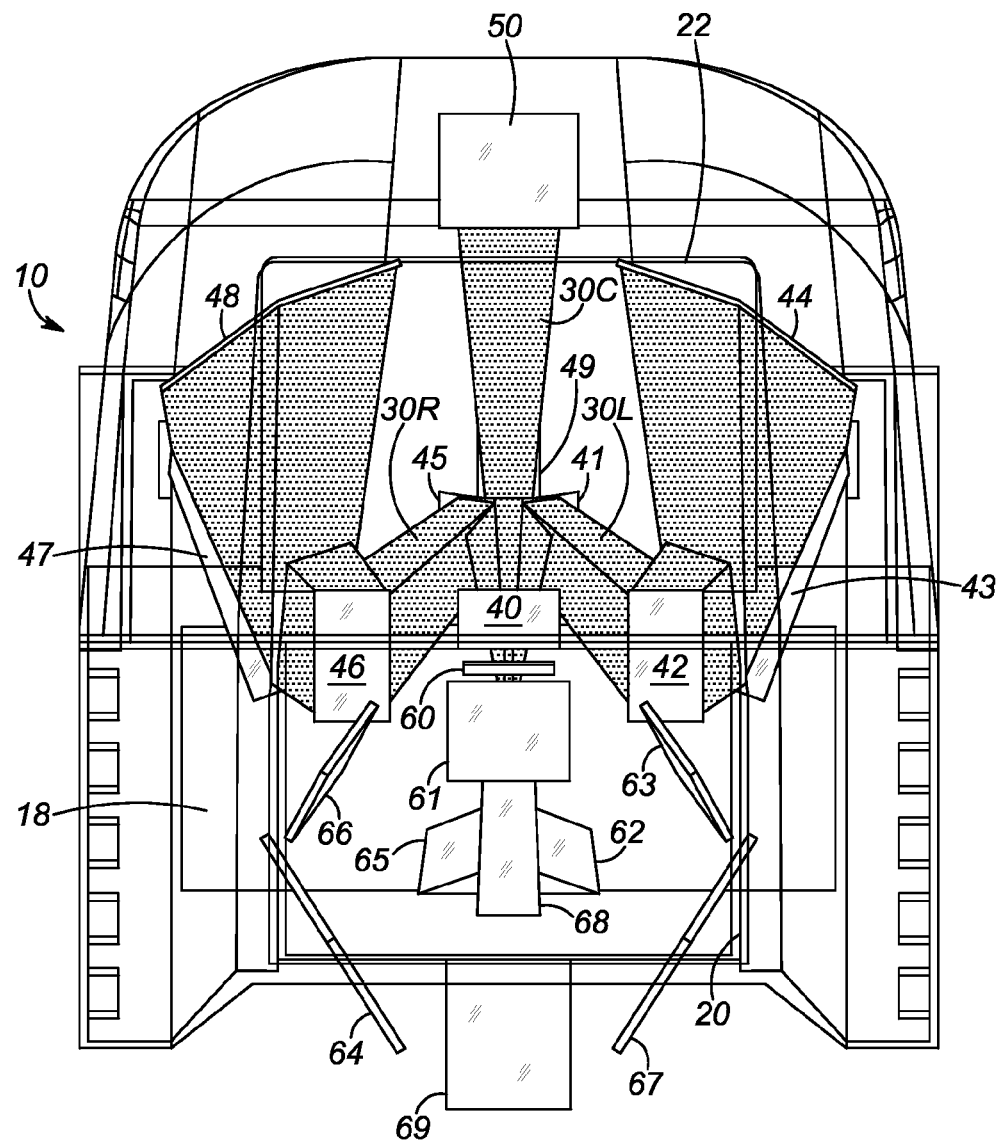
FIG. 6 is a top plan view of the optical system part of FIG. 3 diagrammatically depicting the subfields downstream of the optical splitter.
Figure 7:
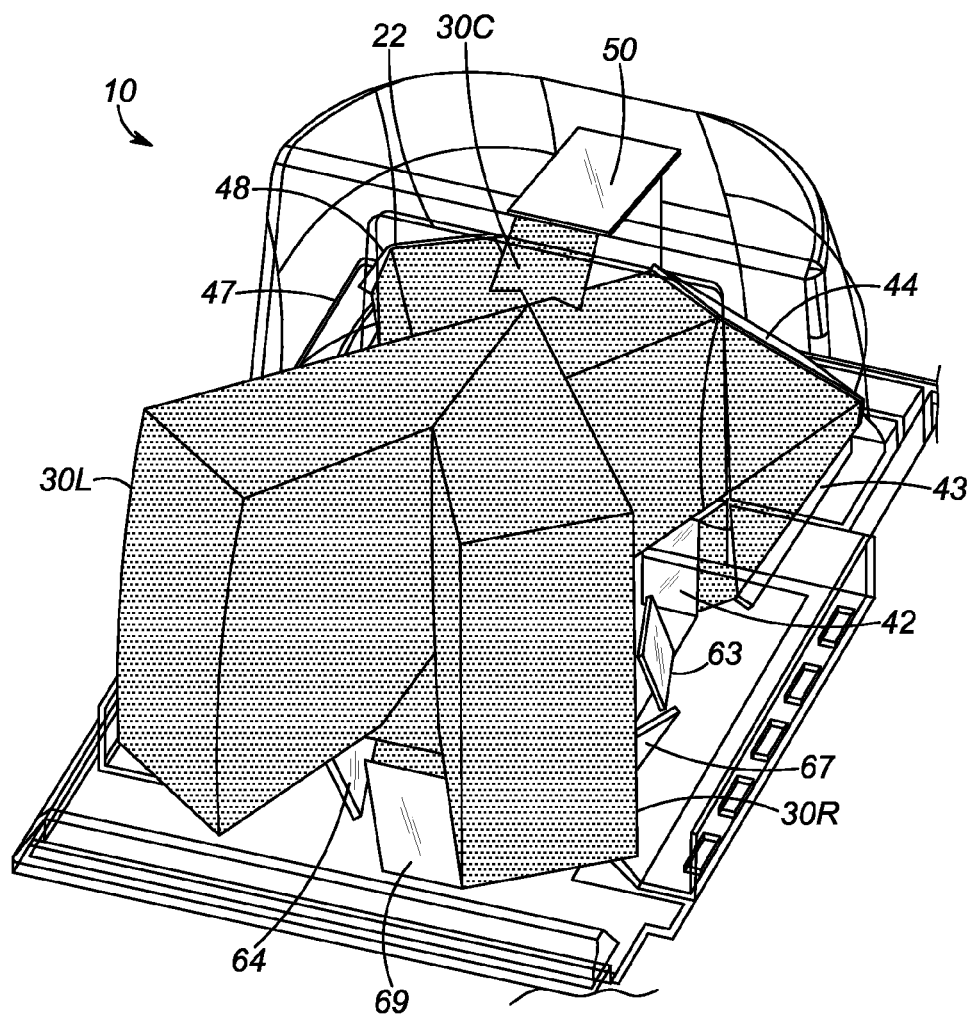
FIG. 7 is a perspective view of the optical system part of FIG. 3 diagrammatically depicting three subfields exteriorly of the upright window of the workstation of FIG. 1.

The aforementioned mirrors 41, 45 and 49, as best seen in FIG. 5, comprise a first optical splitter, wherein the mirror 49 splits a central part of the field of view of the vertical imaging sensor 30 into the center subfield 30C, wherein the mirror 41 splits an outer part of the field of view of the vertical imaging sensor 30 into the outer subfield 30L, and wherein the mirror 45 splits another outer part of the field of view of the vertical imaging sensor 30 into the outer subfield 30R. FIG. 6 best depicts, as seen from above, the separate passage and folding of the outer subfield 30L between the mirrors 44, 43, 42, 41 and 40, as seen from above, and also depicts the separate passage and folding of the outer subfield 30R between the mirrors 48, 47, 46, 45 and 40. FIG. 7 best depicts the separate passage and folding of the outer subfield 30L through the upright window 22 and onto the mirror 44, and the separate passage and folding of the outer subfield 30R through the upright window 22 and onto the mirror 48.

The above discussion for FIGS. 3-7 dealt with the various fold mirrors of the optical system for folding and splitting the subfields 30C, 30L and 30R between the upright window 22 and the vertical imaging sensor 30. The following discussion of FIGS. 8-12 deals with additional fold mirrors of the optical system for folding and splitting additional subfields 32C, 32L and 32R between the horizontal window 20 and the horizontal imaging sensor 32.

Figure 8:
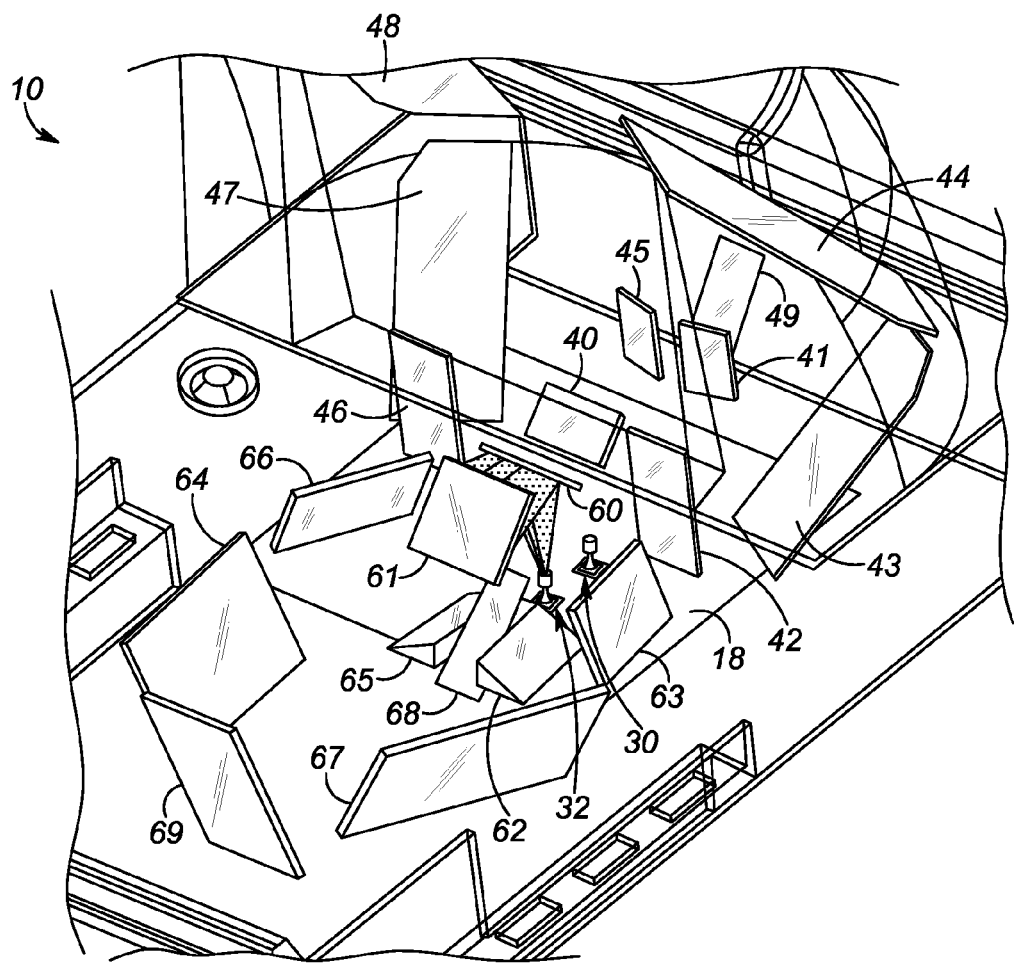
FIG. 8 is a broken-away, enlarged, perspective view of another part of the optical system in the workstation of FIG. 1 diagrammatically depicting part of another folded optical path of the field of view of another imaging sensor prior to reaching another optical splitter.
Figure 9:
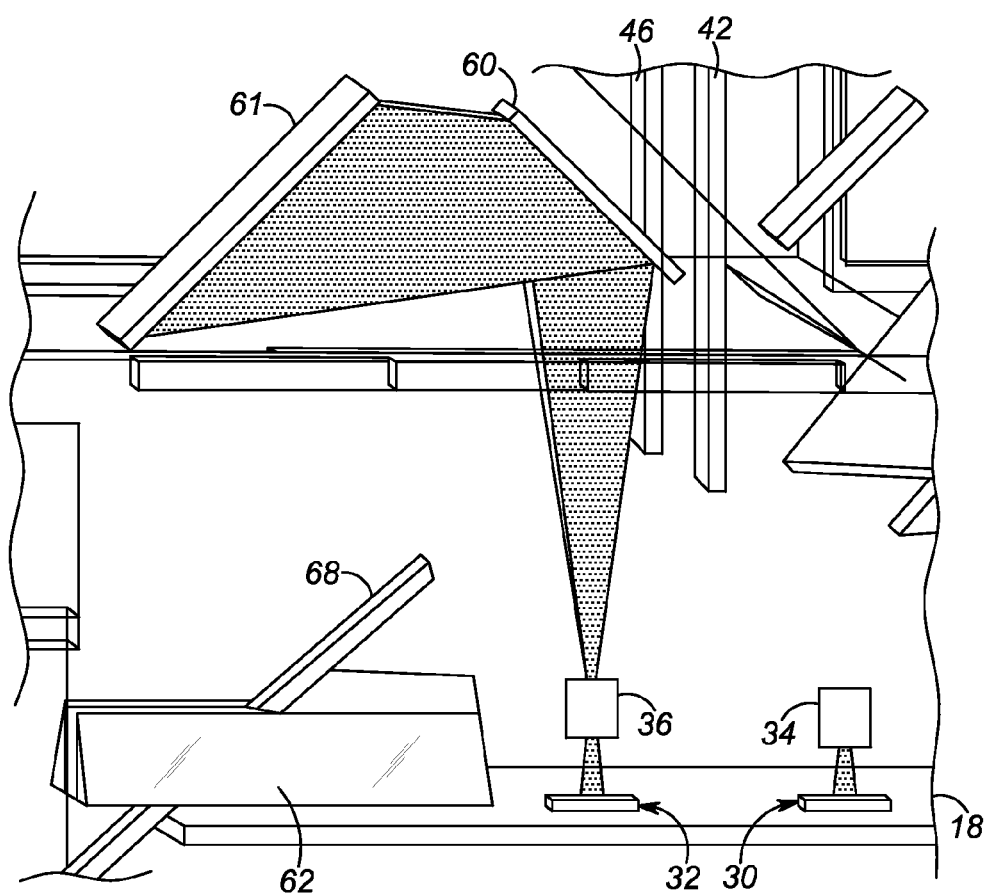
FIG. 9 is a side perspective, enlarged, view of the optical path part of FIG. 8.

Thus, the optical system, as best shown in FIGS. 8-9, includes a fourth plurality of fold mirrors 60, 61, 62, 63 and 64 that are positioned along a first optical path part between the horizontal imaging sensor 32 and the horizontal window 20 to fold the captured return light in the outer subfield 32R to successively reflect off mirrors 64, 63, 62, 61 and 60, in that order, prior to being focused by the imaging lens assembly 36 onto the horizontal imaging sensor 32. In analogous manner, a fifth plurality of fold mirrors 60, 61, 65, 66 and 67 are positioned along a second optical path part between the horizontal imaging sensor 32 and the horizontal window 20 to fold the captured return light in the outer subfield 32L to successively reflect off mirrors 67, 66, 65, 61 and 60, in that order, prior to being focused by the imaging lens assembly 36 onto the horizontal imaging sensor 32. A sixth plurality of fold mirrors 60, 61, 68 and 69 are positioned along a third optical path part between the horizontal imaging sensor 32 and the horizontal window 20 to fold the captured return light in the center subfield 32C to successively reflect off mirrors 69, 68, 61 and 60, in that order, prior to being focused by the imaging lens assembly 36 onto the horizontal imaging sensor 32.

The aforementioned mirrors 62, 65 and 68, as best seen in FIG. 8, comprise a second optical splitter, wherein the mirror 68 splits a central part of the field of view of the horizontal imaging sensor 32 into the center subfield 32C, wherein the mirror 62 splits an outer part of the field of view of the horizontal imaging sensor 32 into the outer subfield 32R, and wherein the mirror 65 splits another outer part of the field of view of the horizontal imaging sensor 32 into the outer subfield 32L.

Figure 10:
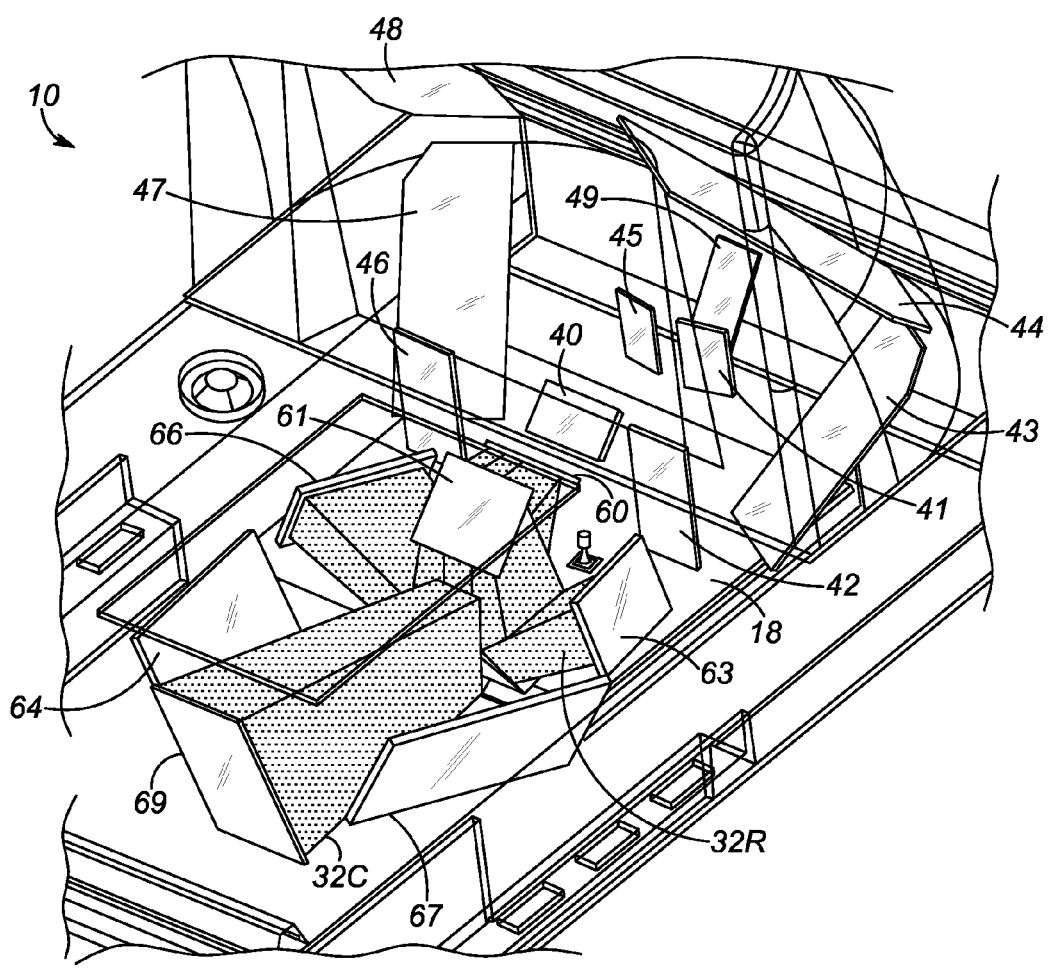
FIG. 10 is a perspective view diagrammatically depicting the subfields downstream of the optical splitter of FIG. 8.
Figure 11:
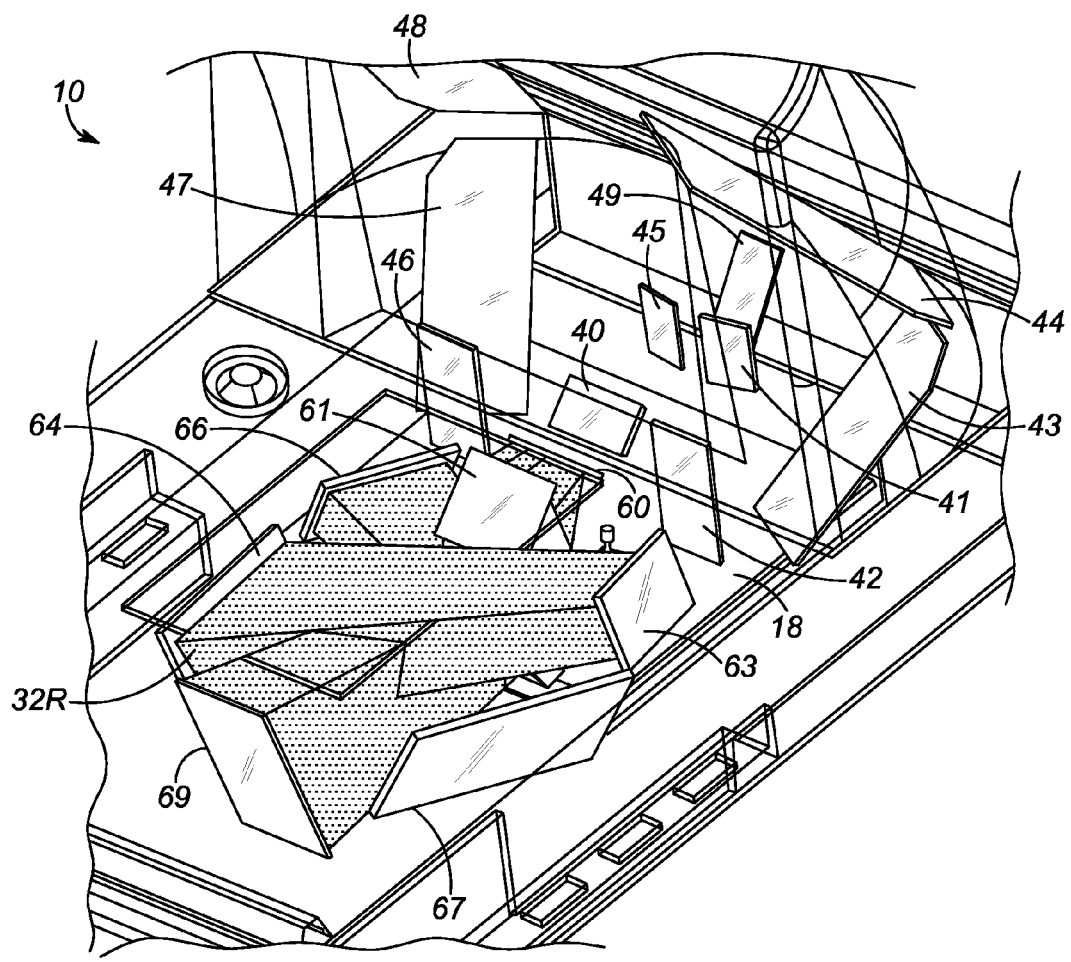
FIG. 11 is a perspective view diagrammatically depicting the subfields still further downstream of the optical splitter of FIG. 8.
Figure 12:
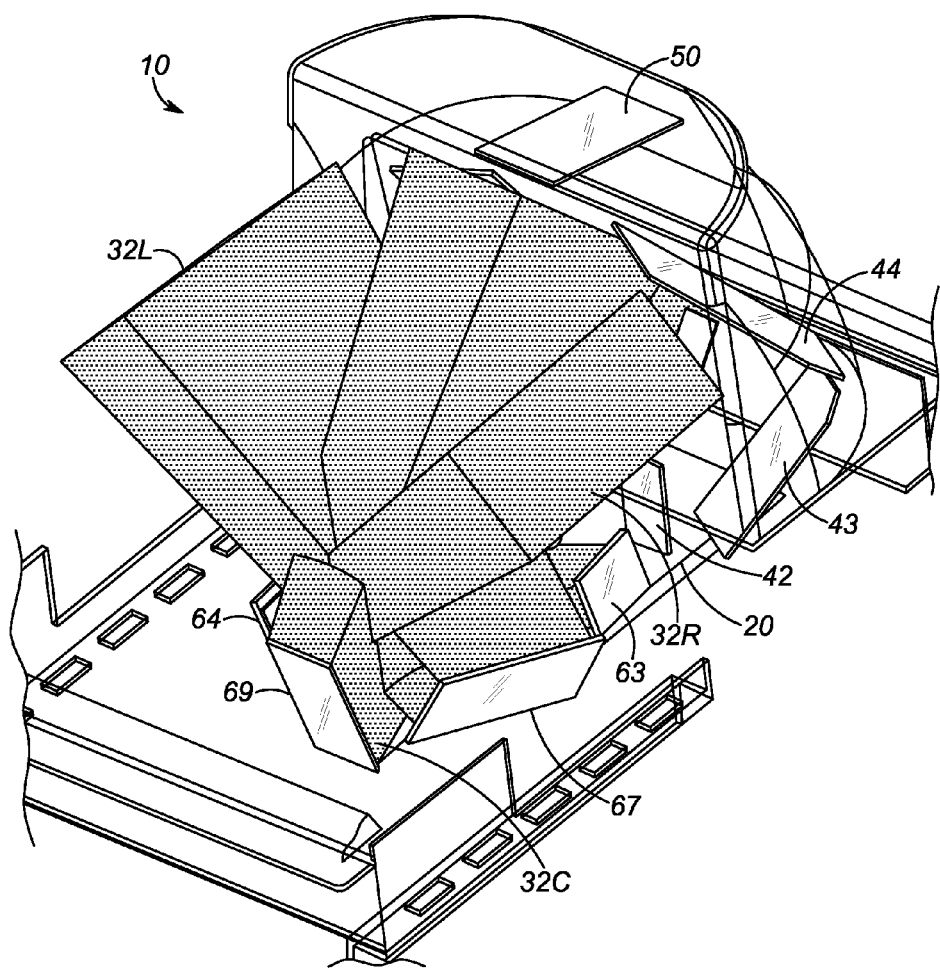
FIG. 12 is a perspective view of the other optical system part of FIG. 8 diagrammatically depicting three subfields exteriorly of the horizontal window of the workstation of FIG. 1.

FIG. 9 best depicts the folding of all three subfields between the mirrors 61 and 60 and the horizontal imaging sensor 32 away from the second optical splitter 62, 65 and 68. FIG. 10 best depicts the separate passage and folding of the outer subfield 32R between the mirrors 62 and 63, and also depicts the separate passage and folding of the outer subfield 32L between the mirrors 45 and 66, and also depicts the separate passage and folding of the central subfield 32C between the mirrors 68 and 69. FIG. 11 best depicts the separate passage and folding of the outer subfield 32R between the mirrors 63 and 64; in analogous manner, it will be understood that the outer subfield 32L passes between the mirrors 66 and 67 (not illustrated so as not to encumber the drawing). FIG. 12 best depicts the separate passage and folding of the outer subfield 32R through the horizontal window 20 and onto the mirror 64, and the separate passage and folding of the outer subfield 32L through the horizontal window 20 and onto the mirror 67, and the separate passage and folding of the central subfield 32C through the horizontal window 20 and onto the mirror 69.

The use of the aforementioned two optical splitters reduces the number of imaging sensors in the workstation 10. Thus, only two imaging sensors 30, 32 are preferably needed to produce the six subfields 30C, 30L, 30R, 32C, 32L and 32R depicted in FIG. 13. These six subfields provide optimum visibility of indicia 14 on the various sides of the product 12 being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users.

As best seen in FIG. 14, energizable illuminators 70C1, 70C2 are mounted in spaced-apart elation rearwardly on board 18 for illuminating central subfield 30C; energizable illuminator 70R is mounted rearwardly on board 18 for illuminating outer subfield 30R; and energizable illuminator 70L is mounted rearwardly on board 18 for illuminating outer subfield 30L. Each illuminator is operative for illuminating its respective subfield with illumination light over an adjustable illumination time, preferably in a range of about 0.25 to about 0.75 milliseconds. Each illuminator preferably includes multiple illumination light sources, e.g., surface-mounted light emitting diodes (LEDs). The imaging lens assembly 34 is operative for capturing the illumination light returned from the indicia in each subfield 30C, 30R and 30L along respective optical paths from the upright window 22 to the vertical imaging sensor 30. Non-illustrated illumination lenses overlie each illuminator to shape the outgoing illumination light and insure that the illumination light substantially fills the subfields 30C, 30R and 30L.

Figure 15:
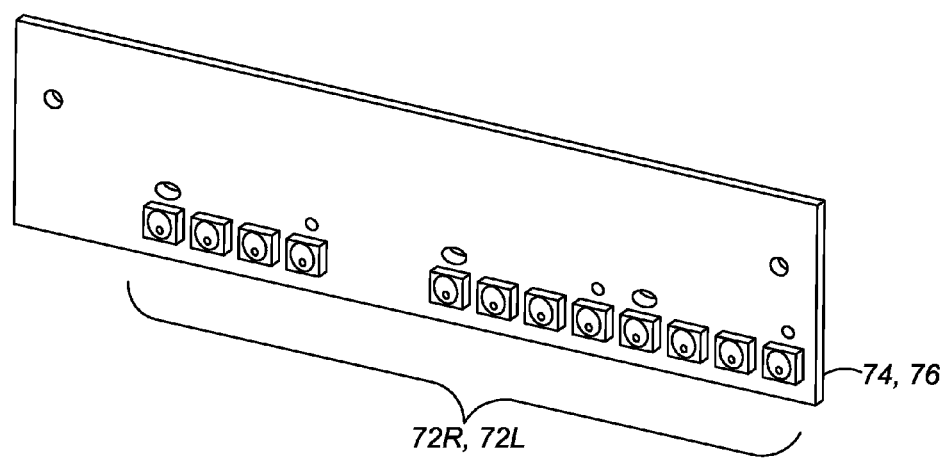
FIG. 15 is a perspective view of an illuminator and an exposure sensor commonly mounted on an auxiliary printed circuit board within the workstation of FIG. 1 in accordance with this invention.
Figure 16:
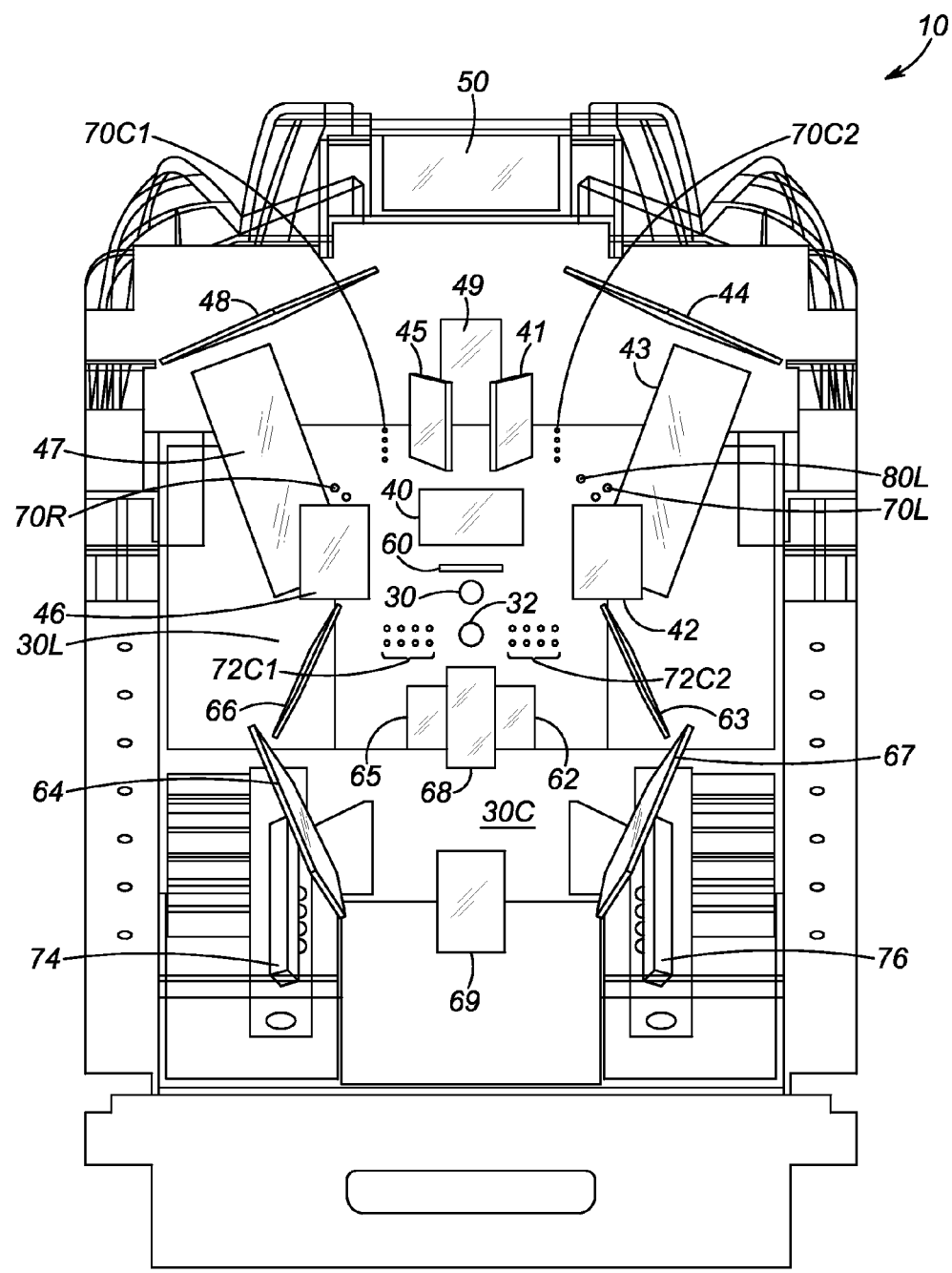
FIG. 16 is a top perspective view of the workstation of FIG. 1.
Figure 17:
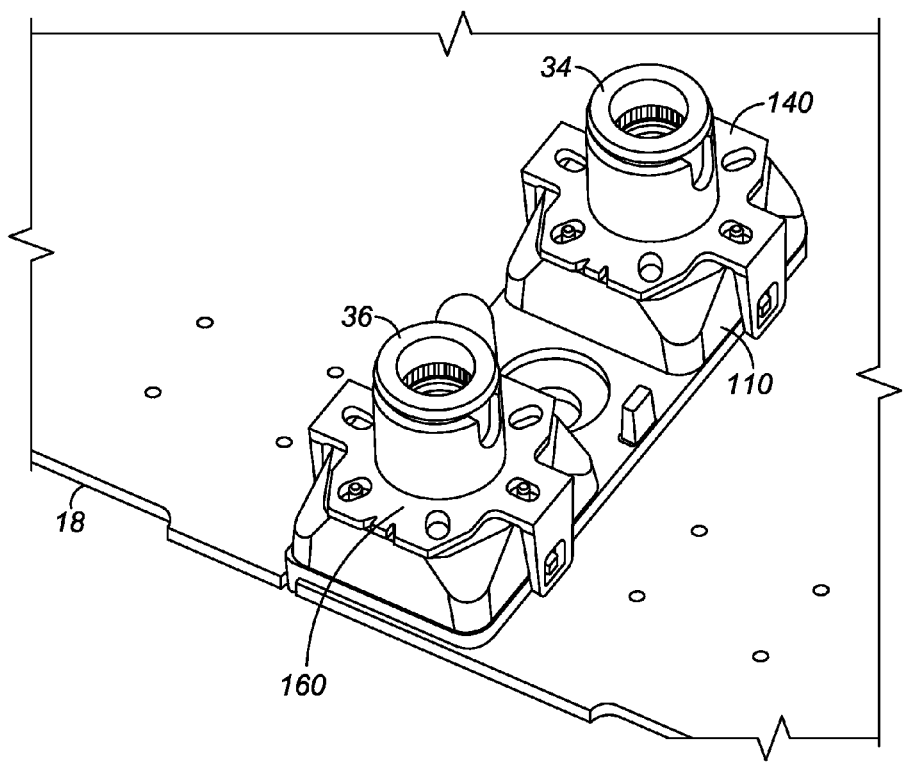
FIGS. 17-21 shows that the pointing direction of each of the two cameras can be individually adjusted by holding a lens assembly in an insert and moving the insert relative to a chassis that is firmly fixed on a single PCB in accordance with some embodiments.

Analogously, as also seen in FIG. 14, energizable illuminators 72C1, 72C2 are mounted in spaced-apart relation forwardly on board 18 for illuminating central subfield 32C. Energizable illuminator 72R is mounted on an auxiliary printed circuit board 74 (shown in isolation in FIG. 15) for illuminating outer subfield 32R; and energizable illuminator 72L is mounted rearwardly on another auxiliary board 76 (again, see FIG. 15) for illuminating outer subfield 32L. FIG. 16 is an overhead view that shows the placement of the auxiliary boards 74, 76. Analogously to that described above, each illuminator 72C1, 72C2, 72R and 72L is operative for illuminating its respective subfield with illumination light over an adjustable illumination time, preferably in a range of about 0.25 to about 0.75 milliseconds. Each illuminator preferably includes multiple illumination light sources, e.g., surface-mounted light emitting diodes (LEDs). FIG. 15 shows such LEDs 72R or 72L on an enlarged scale. The imaging lens assembly 36 is operative for capturing the illumination light returned from the indicia in each subfield 32C, 32R and 32L along respective optical paths from the horizontal window 22 to the horizontal imaging sensor 32. Non-illustrated illumination lenses overlie each illuminator to shape the outgoing illumination light and insure that the illumination light substantially fills the subfields 32C, 32R and 32L.

In use, an operator, such as a person working at a supermarket checkout counter, or a customer in a self checkout stand, processes the product 12 bearing the UPC symbol 14 thereon, past the windows 20, 22 by swiping the product 12 across a respective window, or by presenting the product 12 at the respective window. The symbol 14 may located on any of the top, bottom, right, left, front and rear, sides of the product 12, and at least one, or perhaps both, of the imaging sensors 30, 32 will capture the illumination light reflected, scattered, or otherwise returning from the symbol 14 through one or both windows 20, 22. All three of the subfields 32C, 32R and 32L pass through the horizontal window 20 along different intersecting directions to read three sides of the product. All three of the subfields 30C, 30R and 30L pass through the upright window 22 along different intersecting directions to read three more sides of the product. As shown in FIG. 13, the six subfields substantially fully occupy the scan zone. All six subfields are individually illuminated by their dedicated illuminators. Dedicated external exposure sensors detect the illumination in the individual subfields, and terminate the illumination in each subfield when the correct exposure level for the respective imaging sensor has been determined.

In an imaging-based bioptic barcode scanner, such as the workstation 10 as shown in FIGS. 3-13, the optical path length from a camera in the scanner to an exit window in the scanner is large. The optical path length must be large enough to allow decoding of barcode images starting from the exit window and ending at the mechanical extents of the scanner. Typically this decode length is about 30 cm. For the camera to remain in focus over this entire length, it needs to be located (optically) as far away as 44 cm from the window, depending on the f-number of the system. Because of this large path length from the camera to the window, small variations in the pointing direction of the camera result in large translations of the camera field of view (FOV). For example, a 1-degree error in pointing direction over 44 cm results in a 8 mm sideways translation of the FOV at the window. When the window is small, and the camera pointing error is combined with additional pointing errors contributed by numerous mirrors, these errors can cause clipping of the imaging system FOV at the edges of the exit window. Since the pointing error of the camera contributes more to this problem than pointing errors of the mirrors, because the camera is the furthest object from the window, it is desirable to eliminate the pointing error of the camera. Eliminating pointing error from a camera can be achieved by mounting the camera on a tip/tilt stage. But an imaging-based bioptic scanner (e.g., the workstation 10 as shown in FIGS. 3-13) may have two or more cameras in it. If these multiple cameras (e.g., the vertical imaging sensor 30 and the horizontal imaging sensor 32 in FIGS. 4-5 and FIGS. 8-9) must be mounted to a single printed circuit board (PCB) (e.g., the printed circuit board 18 in FIGS. 4-5 and FIGS. 8-9) to save the cost of multiple PCBs, then it is not always possible to tip and tilt one camera without moving the other. It is desirable to adjust the pointing of multiple cameras on a single PCB in an efficient, low cost—but durable—way.

Figure 18:
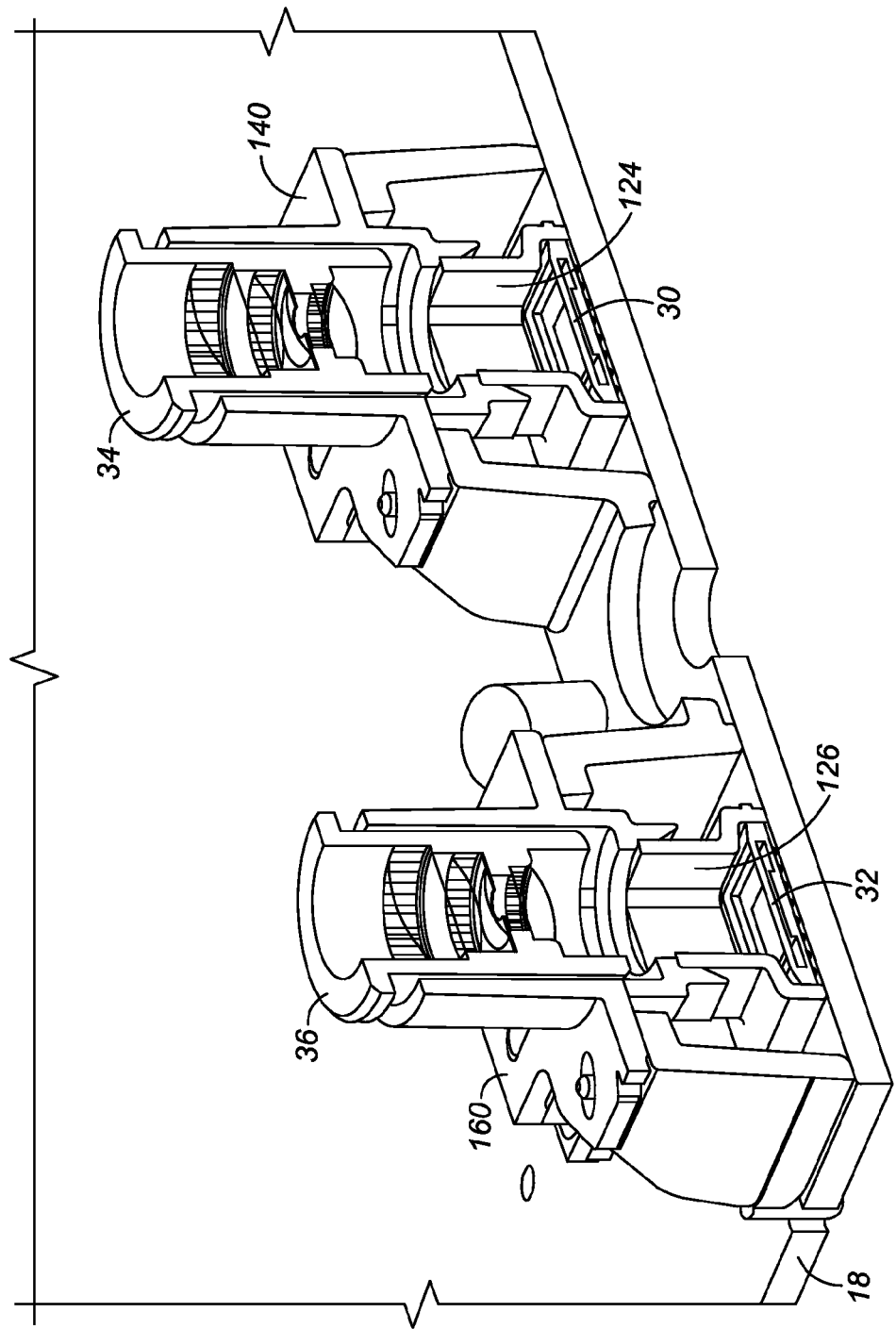
Figure 19:
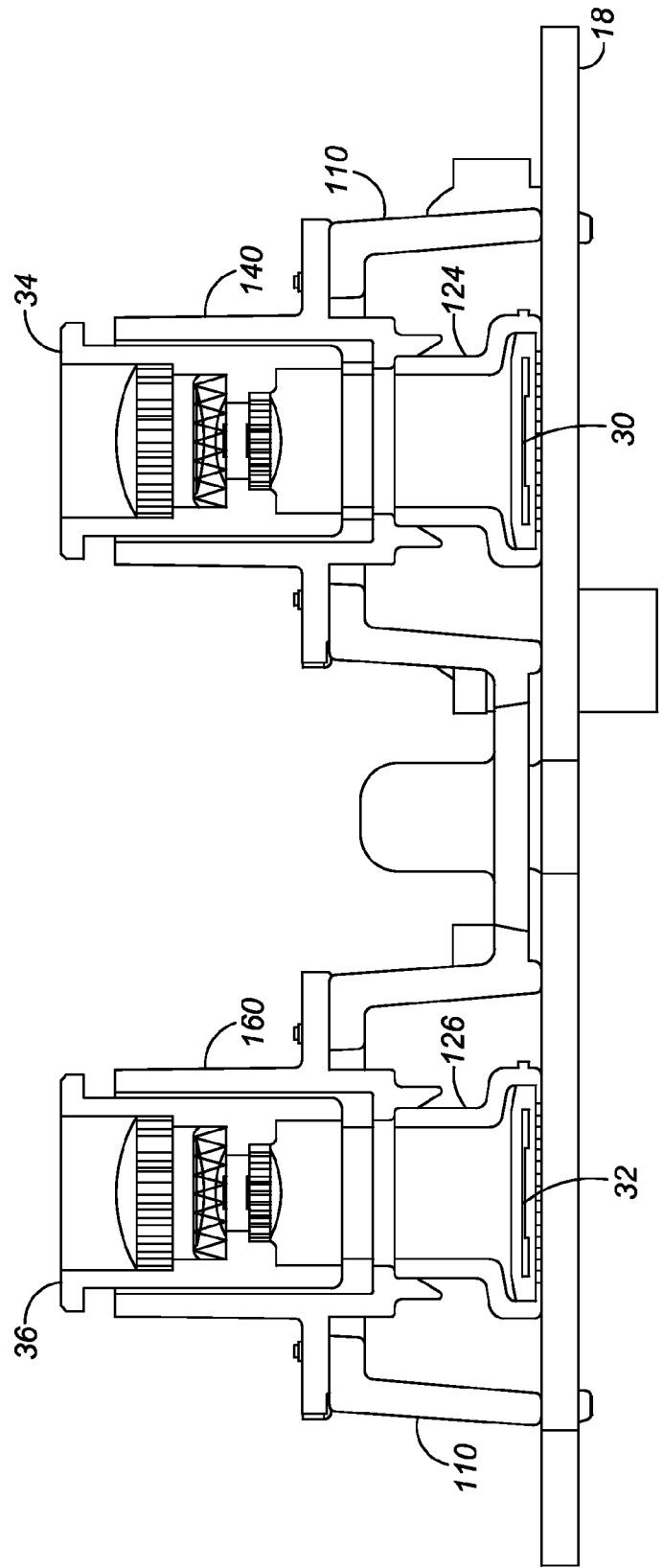
Figure 20:
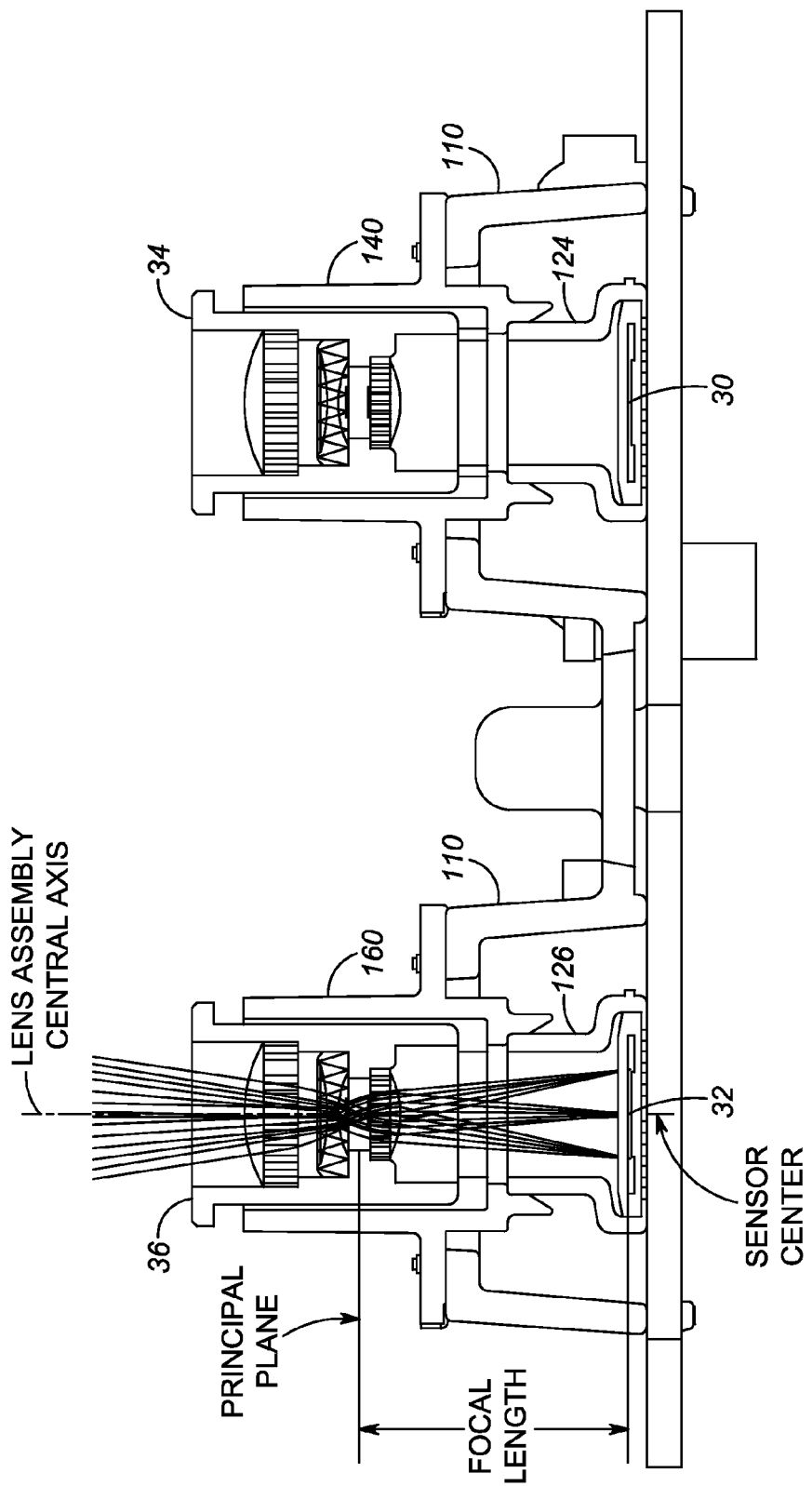

FIGS. 17-21 shows that the pointing direction of each of the two cameras can be individually adjusted by holding a lens assembly in an insert and moving the insert relative to a chassis that is firmly fixed on a single PCB in accordance with some embodiments. As shown in FIGS. 17-21, a single chassis 110 is used to form a structure over a pair of imaging sensors 32 and 30 that are soldered onto a single PCB 18. The chassis 110 is designed to be rigid and opaque, fabricated from black 10% glass-filled polycarbonate plastic. The chassis 110 is located to holes in the PCB 18 using two molded protruding pins, and screwed down using three screws. Unfortunately, a rigid molded part may not reliably make a light-tight seal to a PCB 18 even when screwed down, so there is room for two compliant, elastomeric light gaskets 126 and 124 that fit tightly over and around the sensor packages. To make it possible to adjust the pointing direction of each camera, the lens Assembly for each camera system 36 (or 34) is held by a separate part called the insert 160 (or 140). Each insert 160 (or 140) is resting on a precision plane on the chassis 110 that is located directly above each sensor 32 (or 30). A special mechanism (not shown) slides the insert left-and-right as well as into-and-out-of-the page of the figure as shown in FIGS. 19 and 20. As shown in FIG. 20, the pointing direction of the camera is defined by a light ray drawn between the center of the sensor and the point where the central axis of the lens assembly crosses the principal plane of the lens assembly. Sliding the Insert to the right in the figure makes this ray lean towards the right, and so on.

Implementations of the invention often also include following features. The insert can be made of pure (non-glass-filled) polycarbonate, so that the walls of the tube that holds the lens assembly do not shed glass fiber debris during the focusing of the lens assembly. The walls of the tube of the insert can be lined with precise, shallow ribs that interfere only slightly with the lens assembly and prevent excessive forces from being needed to advance the Lens Assembly further into the tube during final focusing. Even though pure polycarbonate is desirable for smooth, low-force press-fit focusing, it may need to be further improved because of its high Coefficient of Thermal Expansion (CTE). So the height of the chassis 110 is maximized in the assembly so that its glass-filled material—which has a much lower CTE—contributes little CTE-induced height change when the assembly is exposed to elevated temperatures.

The light gasket 126 (or 124) which prevents stray light from hitting the sensor has a compliant chimney-shaped top which mates with a pocket in the bottom of the insert 160 (or 140). The light gasket 126 (or 124) compliance allows the motion of the insert to occur without significant resistance, and the light gasket 126 (or 124) centralizes the insert 160 (or 140) at the start of the adjustment process, like a compliant, self-centering spring, as shown in FIG. 19. The inserts, with their lens assemblies pre-installed in a pre-focus position, are snapped manually onto the chassis 110. The sensors 32 and 30 are cleaned in a clean-room and the light gaskets snap onto the Sensors. Then the PCB 18 can be lowered sensor-side-down onto the chassis 110 (complete with its assembled inserts and lens assemblies) and the PCB 18 can be screwed down. Finally, the entire assembly can be lifted out of a nest without falling apart. In this way the inserts' snaps facilitate assembly and allow the PCB 18 to be handled without the possibility of the Inserts falling off, even though the inserts 160 or 140 are separate from the chassis 110 and are movable. The snaps are sufficiently long and have sufficient clearances that they do not inhibit the motion needed for pointing adjustment.

Figure 21:
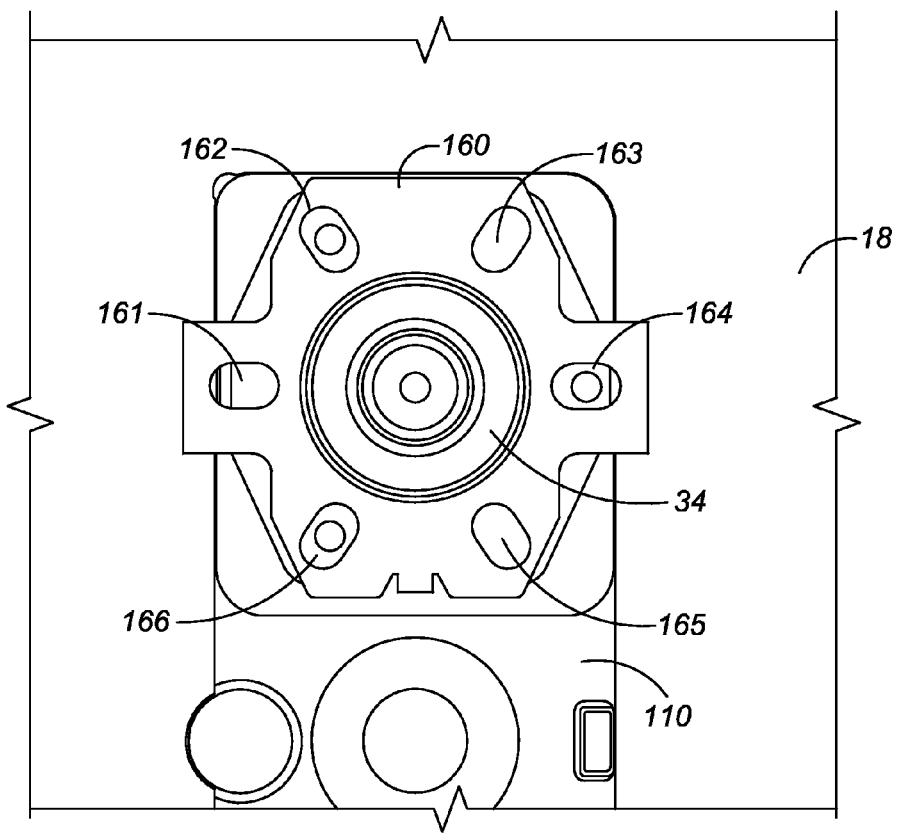

In one implementation, each insert contains six slots on the flange on the insert that mates with its corresponding precision plane on the chassis 110. For example, as shown in FIG. 21, the insert 160 contains slots 161, 162, 163, 164, 165, and 166. These slots are arranged in a 60° star pattern as shown. Because this pattern has left-to-right symmetry, as do the snaps, the insert may be turned 180° during mounting, facilitating manual installation onto the chassis. The three slots 161, 163, and 165, which are labeled "slot for adjustment" in the figure, are in a pattern that is a familiar part of a kinematic optical mount. Three balls or cones from the special adjustment mechanism (not shown) engage these three slots to kinematically fix the Insert to the adjustment mechanism. The use of this arrangement makes it possible for the adjustment mechanism to engage the insert even when there is large mutual misalignment with the Insert, while completely fixing the insert to the mechanism once engaged, allowing smooth and accurate translation. At the same time the downwards force of the adjustment mechanism impinging on these slots ensures that the Insert flange remains in intimate contact with the chassis 110 precision top plane. The three slots 162, 164, and 166, which are labeled "slot for securing" in the figure, engage with pegs that resemble the tips of the adjustment tool, but which are purposely undersize in diameter so that they sit inside the slot and never actually touch the walls of the slots. A light-curing adhesive is placed in these slots before the adjustment process, and the adhesive is cured when the mechanism has succeeded in moving the Insert into its correct position. The correct position is defined when the image of a target on the adjustment mechanism appears precisely at the center pixel of the imaging sensor.

In some implementations, each of the two inserts 160 and 140 can include multiple slots for attaching it to the chassis 110 at a position that is laterally adjustable. In other implementations, only one of the two inserts includes multiple slots for attaching it to the chassis 110 at a position that is laterally adjustable. There are many implementations for the multiple slots on inserts 160 or 140. For example, as shown in FIG. 21, the insert 160 can have six slots 161, 162, 163, 164, 165, and 166 symmetrically distributed on its top. Alternatively, in other implementations (not shown in figures), the insert 160 have more than six slots on its top or less than six slots on its top.

In some implementations, two light gaskets each in contact with the printed circuit board can be used, and each of the two light gaskets can surround one of the two imaging sensors; additionally, each of the two light gaskets can be sandwiched between the printed circuit board and one of inner surfaces of the chassis. For example, as shown in FIGS. 18-20, the light gaskets 126 and 124 are used to surround the imaging sensors 32 and 30 respectively, and each of the light gaskets is sandwiched between the PCB 18 and one of inner surfaces of the chassis 110. In other implementations (not shown in figures), one light gasket that is in contact with the printed circuit board can be used to surround two imaging sensors together, and this light gasket can be sandwiched between the printed circuit board and an inner surfaces of the chassis.

In some implementations, each of the two inserts can include multiple slots for attaching it to a same chassis at a position that is laterally adjustable. For example, as shown in FIGS. 18-20, the two inserts 160 and 140 are attached to a same chassis 110. In other implementations (not shown in figures), the two inserts can be attached to two different chassis 110 each of which is firmly mounted on the printed circuit board; additionally, each of the two inserts can include multiple slots, and each of the two inserts can be attached to one of the two chassis at a position that is laterally adjustable.

While the invention has been illustrated and described as embodied in a workstation for electro-optically reading indicia by using two imaging sensors, it is not intended to be limited to the details shown, since various modifications and structural changes may be made without departing in any way from the spirit of the present invention. For example, the workstation can have more than two imaging sensors. The workstation can have more than two windows. A window of the workstation can be associated with one field of view, two fields of view, three fields of view, or more than three fields of view.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A workstation comprising:
   a housing having a first window located in an upright plane and having a second window located in a horizontal plane that intersects the upright plane;
   at least two imaging sensors each having an array of photosensitive elements with a field of view;
   a printed circuit board having the at least two imaging sensors thereon located in the housing;
   a chassis firmly mounted on the printed circuit board;
   at least two lens assemblies;
   two inserts each configured to hold steadily one of the at least two lens assemblies, wherein at least one of the two inserts includes multiple slots for attaching the at least one of the two inserts to the chassis at a position that is laterally adjustable; and
   a controller in the housing connected to the at least two imaging sensors and operative to read a barcode in an image captured by one of the at least two imaging sensors.

2. The workstation of claim 1, wherein:
   each of the two inserts includes multiple slots for attaching the at least one of the two inserts to the chassis at a position that is laterally adjustable.

3. The workstation of claim 1, further comprising:
   two light gaskets each in contact with the printed circuit board and each surrounding one of the at least two imaging sensors.

4. The workstation of claim 3, wherein each of the two light gaskets is sandwiched between the printed circuit board and one of inner surfaces of the chassis.

5. The workstation of claim 1, further comprising:
a light gasket in contact with the printed circuit board and surrounding the at least two imaging sensors.

6. The workstation of claim 5, wherein the light gasket is sandwiched between the printed circuit board and an inner surface of the chassis.

7. The workstation of claim 1, wherein:
at least one of the two inserts includes six slots for attaching the at least one of the two inserts to the chassis at a position that is laterally adjustable.

8. The workstation of claim 1, further comprising:
two chassis firmly mounted on the printed circuit board; and
wherein each of the two inserts includes multiple slots for attaching said insert to one of the two chassis at a position that is laterally adjustable.

9. The workstation of claim 1, further comprising:
an optical system supported by the housing and operative to split the field of view of one of the at least two imaging sensors into a plurality of subfields of view that simultaneously extend through one of the first window and the second window.

10. The workstation of claim 9, wherein the optical system includes a first optical splitter for splitting the field of view of the one of the at least two imaging sensors into a set of the subfields of view that pass through the one of the first window and the second window.

11. The workstation of claim 9, further comprising:
a plurality of energizable illuminators, one for each subfield of view, for illuminating each subfield of view with illumination light over an adjustable illumination time.

12. A method comprising:
installing at least two imaging sensors on a printed circuit board having a controller thereon connected to the at least two imaging sensors, each of the at least two imaging sensors having an array of photosensitive elements with a field of view, and the controller being operative to read a barcode in an image captured by one of the at least two imaging sensors;
mounting a chassis firmly on the printed circuit board;
inserting each of at least two lens assemblies into one of a corresponding insert;
attaching one of the corresponding insert having multiple slots thereon to the chassis, by fasteners through the multiple slots, at a position that is laterally adjustable; and
placing the printed circuit board inside a housing that has a first window located in an upright plane and a second window located in a horizontal plane that intersects the upright plane.

13. The method of claim 12, comprising:
attaching each one of the corresponding insert having multiple slots thereon to the chassis, by fasteners through the multiple slots, at a position that is laterally adjustable.

14. The method of claim 12, further comprising:
surrounding each of the at least two imaging sensors with a corresponding light gasket that is in contact with the printed circuit board.

15. The method of claim 14, further comprising:
sandwiching the corresponding light gasket between the printed circuit board and an inner surface of the chassis.

16. The method of claim 12, further comprising:
surrounding the at least two imaging sensors with a same light gasket that is in contact with the printed circuit board.

17. The method of claim 16, further comprising:
sandwiching the same light gasket between the printed circuit board and an inner surface of the chassis.

18. The method of claim 12, comprising:
mounting at least two chassis firmly on the printed circuit board;
attaching each of the corresponding insert having multiple slots thereon to one of the at least two chassis, by fasteners through the multiple slots, at a position that is laterally adjustable.

19. The method of claim 12, comprising:
installing an optical system in the housing that is constructed to split the field of view of one of the at least two imaging sensors into a plurality of subfields of view that simultaneously extend through one of the first window and the second window.

20. A workstation comprising:
a housing having a first window located in an upright plane and having a second window located in a horizontal plane that intersects the upright plane;
at least two imaging sensors each having an array of photosensitive elements with a field of view;
a printed circuit board having the at least two imaging sensors thereon located in the housing;
a chassis firmly mounted on the printed circuit board;
at least two lens assemblies;
two inserts each configured to hold steadily one of the at least two lens assemblies;
means for attaching each one of the two inserts to the chassis at a position that is laterally adjustable; and
a controller in the housing connected to the at least two imaging sensors and operative to read a barcode in an image captured by one of the at least two imaging sensors.

* * * * *